Patented June 23, 1942

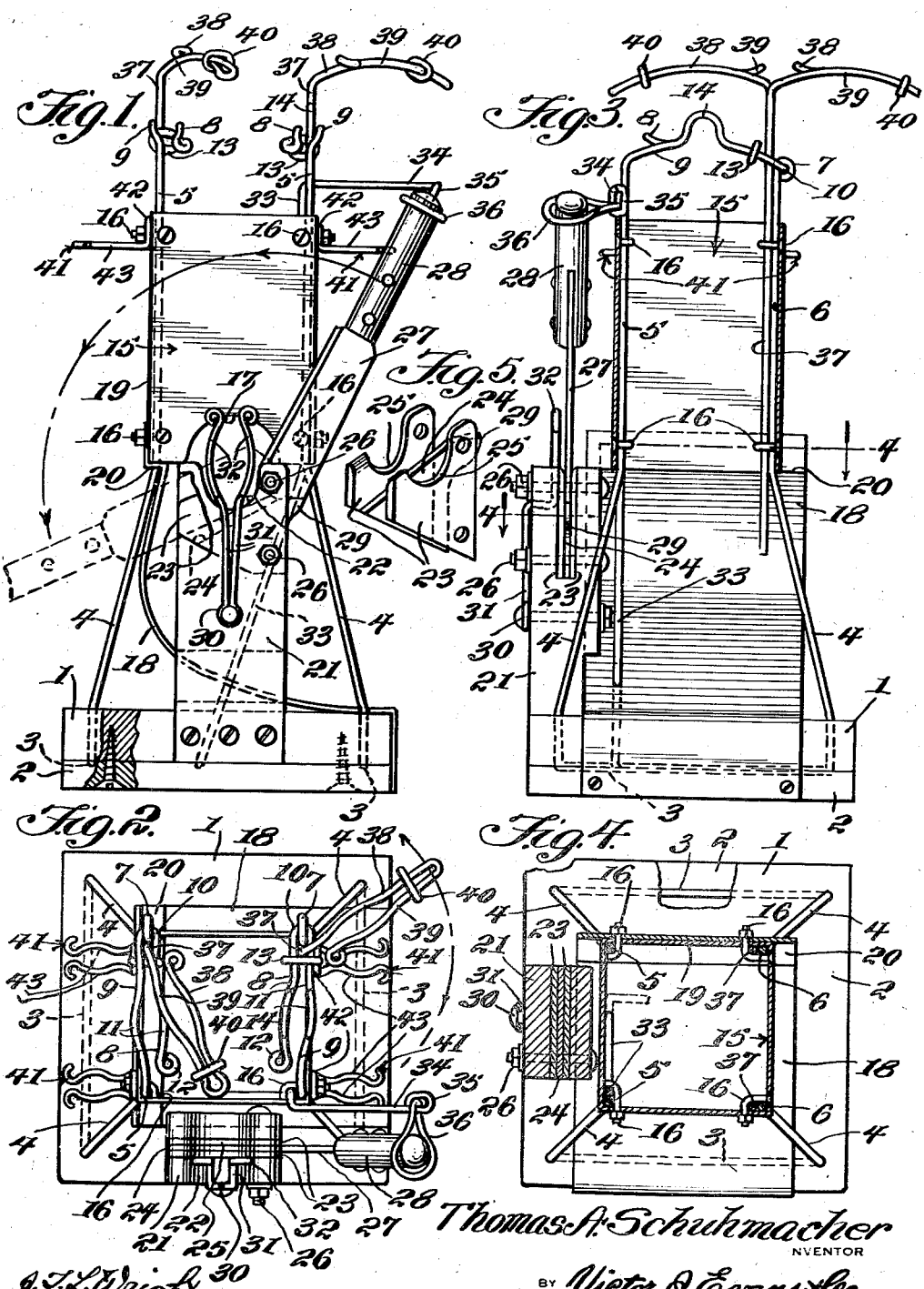

2,287,711

UNITED STATES PATENT OFFICE 2,287,711

POULTRY HOLDING AND BEHEADING DEVICE

Thomas A. Schuhmacher, Chadron, Nebr.

Application August 8, 1941, Serial No. 406,054

3 Claims. (Cl. 17—12)

This invention relates to poultry beheading devices, and its general object is to provide a device by which a fowl can be beheaded in an easy and expeditious manner, in that the fowl is securely held against movement, with its body confined within a housing and the neck arranged in the path of guided cutting means, thus assuring accurate and complete severing of the neck, without otherwise damaging or bruising the flesh of the fowl, as well as maintaining the same free from dirt and in a sanitary and marketable condition.

A further object is to provide a poultry beheading device that is adjustable to accommodate poultry of various sizes and kinds, and includes means for holding the poultry in a convenient position for removing the feathers therefrom.

Another object is to provide a poultry beheading device that can be easily cleaned, is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a front view of the device, with the cutting means or knife in normal position in full lines and at the end of its cutting stroke in dotted lines.

Figure 2 is a top plan view of the device.

Figure 3 is a side view, with parts in section.

Figure 4 is a sectional view taken approximately on line 4—4 of Figure 3, looking in the direction of the arrows.

Figure 5 is a perspective view of the guiding means for the cutting blade.

Referring to the drawing in detail, it will be noted that the device includes a base in the form of a flat square block which is made up of upper and lower sections 1 and 2 secured together by screws as shown, and securely mounted in grooves in the confronting faces of the sections adjacent the front and rear thereof, are the lower horizontal portions 3 of a pair of wire like supporting rods that extend through vertical bores in the upper section. Each rod from the top of the upper section is bent to provide lower converging upright portions 4 and upper parallel portions 5 and 6.

The portions 6 terminate at their upper ends in eyes 7, but each rod from the upper end of the portions 5 is formed to provide a pair of substantially horizontally disposed upwardly curved parallel companion clamping jaws 8 and 9, by looping the rods as at 10, with the loops passing through the eyes for supporting the jaws in bridging relation between the upper ends of the portions 5 and 6, as best shown in Figure 3. The jaws of each pair are rounded outwardly between their ends, as at 11 for receiving the legs of a fowl and the inner jaws 8 terminate at their free ends into eyes 12. The jaws 8 are normally spaced from the jaws 9 and are inherently yieldable, so as to allow free insertion of the legs of the fowl between the jaws. The legs are clamped between the jaws, by rings 13 mounted for slidable movement on the jaws, as best shown in Figure 2. Either or both pair of jaws may be looped upwardly as at 14 to provide a seat for receiving a supporting nail or the like, so that the device can be conveniently hung thereon, when not in use.

The rods provide supporting means for a housing 15 of rectangular formation, and which is preferably made from sheet metal. The housing is mounted on the upper parallel portions 5 and 6 to rest upon the upper ends of the converging portions 4, as best shown in Figure 3, with the parallel portions 5 and 6 disposed in the corners of the housing, and held accordingly by bolt and nut connections 16, the bolts being of right angle formation, and extend through the housing adjacent the upper and lower ends and the corners thereof, as best shown in Figure 4, to set up a binding engagement against the parallel portions. The upper and lower ends of the housing are open, and the front wall from its lower edge is provided with a substantially semi-circular recess 17 for the passage of the head of a fowl therethrough, for a purpose which will be later apparent.

Arranged to underlie the housing is a drip plate or shield 18 that is made from a single piece of sheet metal and extends in rounded formation from one side wall 19 of the housing to the side of the base opposed to that wall, as best shown in Figure 1. The upper end of the plate 18 is fixed to the housing wall by certain of the bolt and nut connections 16 and the plate is bent adjacent its upper end to provide a shoulder 20 engaged with the lower end of the side wall 19, while the lower end portion of the plate is bent about the side of the base and secured thereto by screws, as best shown in Figures 1 and 3. By that construction, it will be obvious that the plate 18 will catch the blood and direct the same to the ground laterally of the device.

Mounted within a recess in the front side of the upper section 1 and secured therein by screws or the like, is the lower end of an upright or post 21 that has its upper end disposed flush with the lower end of the housing, as best shown in Figure 3, and the upper end of the post has a substantially semi-circular recess 22 therein which registers with the recess 17 of the front wall of the housing, as best shown in Figure 1, so that the recess 22 will receive the neck of the fowl when the head is inserted through the recess 17. The inner face of the post is grooved to accommodate the adjacent side edge portion of the drip plate, and such supports the drip plate between its ends, as will be apparent.

Secured to and mounted within a kerf in the upper end of the post is a pair of spaced metallic guide plates 23 that are held in spaced relation by a separator 24 disposed between the plates, as best shown in Figure 5. The guide plates are recessed as at 25, with the recesses flush with the recess 22, and the entire upper edges of the guide plates 23 are preferably beveled inwardly, as clearly shown in Figure 3.

Mounted for swinging movement between the guide plates and on the upper bolt of the bolt and nut connections 26 that secure the guide plates 23 in the kerf of the post 21, is the lower end of the blade 27 of a knife that is provided with a handle 28. By that construction, it will be obvious that when the knife is swung on its pivot from its normal upright position of Figure 1, to the dotted line position of that figure, as shown by the arrows, that the beveled edge of the blade will pass through the recess 22 and thus will sever the neck of a fowl resting in the recess. The upper end of the separator 24 is inclined to allow for the free swinging movement of the knife, and the separator is formed to provide an abutment lug 29 for the outer end of the blade 27 of the knife, the outer end being shaped to fit the lug, and to rest thereon, as best shown in Figure 1.

In order to hold the head of the fowl with its neck firmly in the recess 22 in the path of the cutting blade 27, I provide a clamping member that is preferably made from a single strand of wire looped midway its ends to provide an eye 30, from which extends shanks 31 having formed thereon arcuate companion clamping jaws 32, the clamping member being fixed to the front face of the post 21, with the shanks bent into the recess 22, for disposing the jaws 32 therein for receiving the neck of a fowl. The outer ends of the jaws 32, terminate in eyes, as best shown in Figure 1.

The knife is preferably held in its upright or normal position by means other than the abutment lug 29, and for that purpose, I provide a rod 33 having its lower end fixed between the base sections. The rod 33 extends through a bore in the upper section 1, through the plate 18 and through the housing to be held in one of the corners thereof by certain of the bolt and nut connections 16, and the upper end of the rod 33 is bent at right angles to provide an outwardly directed portion 34 that terminates at its outer end into an elongated eye 35, the latter having mounted therein for pivotal and slidable movement a ring member 36 for disposal about the handle 28 of the knife, as clearly shown in Figures 1 and 3.

I likewise provide means for holding the legs of fowls which may be too long to be firmly held in proper position by the jaws 8 and 9, and such means are formed from rods that include a pair of upright portions 37 held in the rear corners of the housing by the bolt and nut connections 16, for vertical movement and formed on the upper end of each of the portions 37 is a pair of substantially horizontally disposed upwardly curved parallel companion clamping jaws 38 and 39 which are preferably identical to the jaws 8 and 9, with the exception of the loops 14. The jaws 38 and 39 are likewise held in clamping position against the legs of a fowl by rings 40, that are slidably mounted on the jaws, as will be apparent upon inspection of Figure 2. Due to the vertical adjustment of the upright portions 37 and thus the jaws 38 and 39, it will be obvious that the jaws 38 and 39 are capable of holding the legs of a fowl of any length, to properly position the body of the fowl within the housing, with the neck and head extending through the recess 17 to rest on the seat provided by the recess 22. The upright portions 37 are likewise rotatably mounted, so that the jaws 38 and 39 can be swung outwardly to a position for holding the legs of a fowl with the latter exteriorly of the housing, and in a convenient position to remove the feathers therefrom.

I likewise provide leg clamping means or hangers 41 for holding a fowl to remove the feathers therefrom, on the side walls of the housing, and the latter clamping means are each formed from a single strand of rodlike wire to provide an eye 42, with arcuate clamping jaws 43 formed on and extending at right angles therefrom and terminating in outwardly curved ends. The clamping means 41 are secured to the bolts of the bolt and nut connections 16 for the jaws 43 to extend laterally from the side walls of the housing, as clearly shown in Figures 1 and 2.

From the above description and disclosure in the drawing, it is believed that the use of my device will be obvious, but it might be mentioned that when it is desired to behead a fowl, the body is placed within the housing 15 and the legs are clamped either between the jaws 8 and 9 or 38 and 39, it depending upon the length of the fowl, as will be apparent. The head of the fowl is then pulled through the recess 17 and disposed between the jaws 32 for the latter to set up a clamping engagement therewith to hold the neck seated in the recess 22. The knife is then released from the ring member 36 and moved downwardly on its pivot to sever the neck, and due to the fact that the blade is guided in its movement between the plates 23 and the fowl is held against movement, it will be further obvious that the fowl will be beheaded in an easy, expeditious and accurate manner. When the head is removed, the weight of the fowl tends to draw the neck within the housing so that the blood will drip therefrom onto the plate 18, and thus run from the device onto the ground.

After the fowl has been killed, it is removed from the housing and hung either on the jaws 43 or jaws 38 and 39, for removing the feathers therefrom.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A poultry holding and beheading device comprising a base, rods secured to said base and including upright portions, a rectangular housing secured to the upright portions and supported thereby above the base, said housing having open upper and lower ends and adapted to receive a fowl therein, means secured to and rising from the base and having a seat in the upper end thereof for receiving the neck of the fowl, cutting means pivotally secured for swinging movement relative to the seat for severing the neck, a drip shield between the base and the housing to underlie the latter for receiving blood to direct the same from the device, said upright portions extending above the housing, spring clamping jaws for holding the legs of the fowl and formed on the upper ends of certain of said upright portions and connected to the other upright portions for the latter to support the jaws, and means for holding the neck in the seat.

2. A poultry holding and beheading device comprising a flat blocklike base including upper and lower sections fixed together in face to face relation, rods including horizontal portions secured between the sections and converging portions rising from the base, parallel portions formed on the upper ends of the converging portions, a rectangular housing provided with open upper and lower ends and having the parallel portions secured to and mounted in the corners thereof, with the lower end of the housing resting on the converging portions at the juncture thereof with the parallel portions for supporting the housing above the base, said housing adapted to receive a fowl therein, means secured to and rising from the base and having a seat in the upper end thereof for receiving the neck of the fowl, cutting means pivotally secured for swinging movement relative to the seat for severing the neck, a drip shield between the base and the housing to underlie the latter, spring clamping jaws for holding the legs of the fowl and formed on the upper ends of certain of the parallel portions and connected to the other parallel portions for the latter to support the jaws, and means for holding the neck in the seat.

3. A poultry holding and beheading device comprising a base, rods secured to said base and including upright portions, a rectangular housing secured to the upright portions and supported thereby above the base, said housing having open upper and lower ends and adapted to receive a fowl therein, means secured to and rising from the base and having a seat in the upper end thereof for receiving the neck of the fowl, cutting means pivotally secured for swinging movement relative to the seat for severing the neck, said upright portions extending above the housing, spring clamping jaws for holding the legs of the fowl and formed on the upper ends of certain of said upright portions, said jaws being arranged in pairs and the jaws of each pair being outwardly rounded between their ends for receiving the legs therein, ring means slidably mounted on each pair of jaws for holding the same in clamping relation, eyes formed on the upper ends of the other upright portions and having the jaws connected thereto, and means for holding the neck in the seat.

THOMAS A. SCHUHMACHER.